United States Patent [19]

Ripberger et al.

[11] Patent Number: 4,638,725
[45] Date of Patent: Jan. 27, 1987

[54] LIGHT ALLOY PISTON

[75] Inventors: Emil Ripberger, Remseck; Gotthard Stuska, Fellbach, both of Fed. Rep. of Germany

[73] Assignee: Mahle GmbH, Fed. Rep. of Germany

[21] Appl. No.: 828,789

[22] Filed: Feb. 13, 1986

[30] Foreign Application Priority Data

Feb. 14, 1985 [DE] Fed. Rep. of Germany ....... 3505037

[51] Int. Cl.$^4$ ................................................ F16J 1/04
[52] U.S. Cl. .................................................... 92/237
[58] Field of Search ......................... 92/208, 234, 237

[56] References Cited

U.S. PATENT DOCUMENTS 4,161,165 7/1979 Belush et al. ......................... 92/237

*Primary Examiner*—Allen M. Ostrager
*Attorney, Agent, or Firm*—James C. Wray

[57] ABSTRACT

In a light plunger piston for internal combustion engines, in order further to save weight and to achieve an elastic running behaviour, the piston skirt is reduced to three relatively narrow guide plates. The guide plates are attached through longitudinal ribs to gudgeon pin bushes suspended freely from the piston crown. On the thrust side of the piston there are two of the three guide plates which extend, seen from a 45 degrees diagonal plane between gudgeon pin axial plane and connecting rod oscillation plane, through about 15-25 degrees to each of the two sides. On the counter-thrust side only one pressure plate is provided which extends circumferentially over about 50 degrees. There is preferably no direct connection between the guide plates and the lowermost ring land.

4 Claims, 2 Drawing Figures

LIGHT ALLOY PISTON

BACKGROUND TO THE INVENTION

The invention relates to a light plunger piston for internal combustion engines having gudgeon pin bosses suspended freely on the piston crown and skirt. The bosses comprise segments covering individual partial zones of the piston circumference.

Such a piston is known from EP No. 0,050,256 A1.

OBJECT OF THE INVENTION

It is an object of the present invention still further to increase the flexibility already present in the skirt region of that known piston, while maintaining good lateral guidance of the piston in the direction of the gudgeon pin axis.

SUMMARY OF THE INVENTION

According to the invention there is provided a light alloy piston for internal combustion engines comprising
(a) a piston crown,
(b) a skirt depending from said crown and having external surfaces for sliding engagement within a cylinder bore,
(c) a pair of gudgeon pin bosses suspended freely on the piston crown and a skirt, which bosses except for a narrow ring land beneath the lowermost piston ring groove lying above the gudgeon pin bores, consist merely of segments covering individual partial zones of the piston circumference,
(d) two guide plates provided on one of the bearing sides of the piston as skirt elements,
(e) ribs for supporting said guide plates on the gudgeon pin boss respectively, each rib extending in the longitudinal direction of the piston, with outer surfaces adapted to the cylinder bore surface which extend circumferentially, seen from the diagonal plane lying at 45 degrees between gudgeon pin plane and connecting rod oscillation plane, each through about 15–25 degrees to both sides, and
(f) a single guide plate formed on to the ring part section of the piston head part on the opposite bearing side as a skirt element and beyond the narrow ring land lying beneath the lowermost ring groove, which guide plate reaches in the piston longitudinal direction at least to the level of the gudgeon pin axis and extends circumferentially 10 degrees to 25 degrees to each side of the plane of oscillation of the connecting rod.

Due to the lateral edge retraction which may be provided on the skirt guide plates a hard striking of the lateral guide plate edges on the cylinder bore surface can be avoided.

The single guide plate formed to the ring part of the piston head on one of the bearing sides of the skirt centrally between the gudgeon pin bosses may be stiffened by the metal strip formed to it in the interior.

If a metal strip of a material of lower thermal expansion than that of the piston basic material is used the metal strip achieves a regulating effect in the relevant guide plate. This regulating effect acts so that the lower end of the relevant guide plate is retracted radially inwards with rising temperature.

BRIEF DESCRIPTION OF DRAWINGS

An example of embodiment of the invention is represented in the accompanying drawing, wherein.

DESCRIPTION OF PREFERRED EMBODIMENTS

Figure 1:
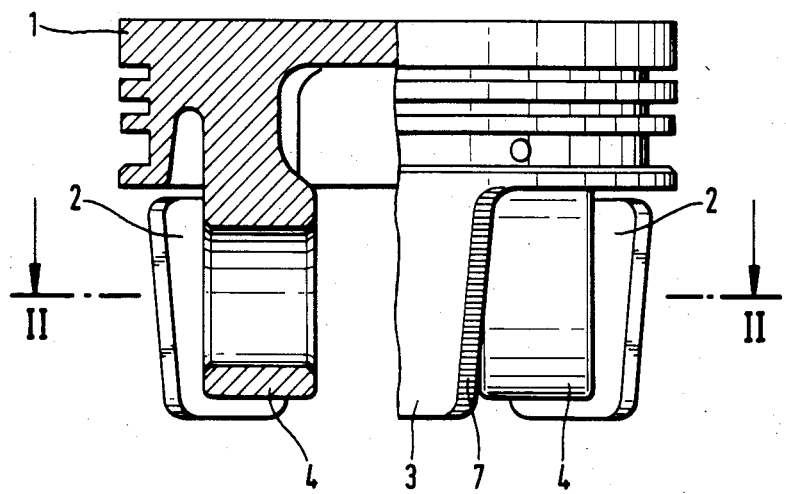
FIG. 1 shows a piston partially in section (left part) and partially in elevation (right part)
Figure 2:
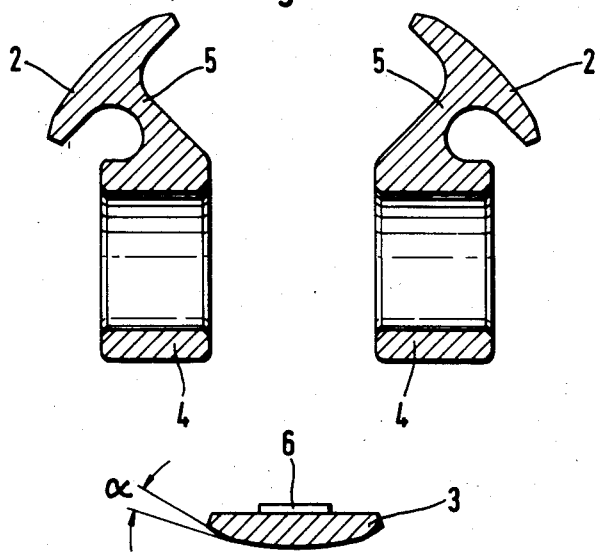
FIG. 2 shows a section through the piston along the line II—II.

The piston is of aluminium and consists essentially of a head part 1 with ring part, the guide plates 2, 3 in the skirt region and the gudgeon pin bosses 4 freely suspended on the piston crown. The guide plates 2 are in connection with the piston upper part solely through the ribs 5 issuing from the gudgeon pin bosses 4. The ribs 5 are arranged at an angle of 45 degrees to the gudgeon pin axis, with apex point of the angle in the axis of the piston. Thus the ribs 5 lie on the 45 degree diagonal plane between the gudgeon pin plane and connecting rod oscillation plane. The arrangement of the ribs 5 at such an angle ensures excellent running properties in the piston according to the invention. The guide plates 2 in the circumferential direction are symmetrical in surface to the 45 degree diagonal plane and thus likewise to the ribs 5. At their upper end the guide plates 2 extend each over an angle of about 40 degrees. The guide plates 2 taper downwards, namely on their two longitudinal sides each at an angle of 10 degrees. Such a downwardly tapering surface formation proved especially favourable in relation to the saving of weight and the running behaviour of the piston. The guide plates 2 are arranged with spacing beneath the lowermost land of the ring part.

While the guide plates 2 are arranged preferredly on the thrust side of the piston, only one guide plate 3 formed directly on the piston head is provided on the opposite side of the piston. The width of the guide plate 3 in the circumferential direction likewise narrows towards the lower end of the piston, similarly to the guide plates 2. At the upper end this guide plate extends over an angle of 50 degrees which decreases to 40 degrees towards the lower end.

In the longitudinal direction a metal strip 6 is formed in on the interior of the guide plate 3 and reaches in the piston head part 1 as far as the underside of the piston crown. The metal strip 6, if it is of a material the coefficient of thermal expansion of which is lower than that of aluminium, has a regulating effect in the guide plate 3 to the effect that the lower end of the guide plate 3 retracts radially inwards with rising temperature. The side regions 7 of the guide plate shown in hatched lines are retracted radially inwards at an angle of $\alpha = 4$ degrees, namely in such a way that the side edge of the guide surface is set back by 50–100 μm from its main bearing surface.

We claim:
1. A light alloy piston for internal combustion engines comprising
(a) a piston crown,
(b) a skirt depending from said crown and having external surfaces for sliding engagement within a cylinder bore,
(c) a pair of gudgeon pin bosses suspended freely on the piston crown and a skirt, which bosses except for a narrow ring land beneath the lowermost piston ring groove lying above the gudgeon pin bores, consist merely of segments covering individual partial zones of the piston circumference, (d) two guide plates provided on one of the bearing sides of the piston as skirt elements, (e) ribs for supporting said guide plates on the gudgeon pin boss respectively, each rib extending in the longitudinal direction of the piston, with outer surfaces adapted to the cylinder bore surface which extend circumferentially, seen from the diagonal plane lying at 45 degrees between gudgeon pin plane and connecting rod oscillation plane, each through about 15-25 degrees to both sides, and (f) a single guide plate formed on to the ring part section of the piston head part on the opposite bearing side as a skirt element and beyond the narrow ring land lying beneath the lowermost ring groove, which guide plate reaches in the piston longitudinal direction at least to the level of the gudgeon pin axis and extends circumferentially 10 degrees to 25 degrees to each side of the plane of oscillation of the connecting rod.

2. A piston according to claim 1, wherein the bearing surfaces of the guide plates are retracted inwards on the relevant side edges in the circumferential direction towards both side edges at an angle of 2-5 degrees to a radial depth of 50-150 μm.

3. A piston according to claim 2, wherein a metal strip extending in the longitudinal direction, of material of higher strength compared with the basic material of the piston is formed on or in on the inside of the single guide plate arranged on one of the bearing sides.

4. A piston according to claim 3, wherein the coefficient of thermal expansion of the metal strip is lower than that of the basic material of the piston.

* * * * *